(12) United States Patent
Sparrow

(10) Patent No.: US 9,540,064 B2
(45) Date of Patent: Jan. 10, 2017

(54) DIVE LIGHT

(71) Applicant: Roger Lionel David Sparrow, Petworth (GB)

(72) Inventor: Roger Lionel David Sparrow, Petworth (GB)

( * ) Notice: Subject to any disclaimer, the term of this patent is extended or adjusted under 35 U.S.C. 154(b) by 0 days.

(21) Appl. No.: 13/732,565

(22) Filed: Jan. 2, 2013

(65) Prior Publication Data

US 2013/0335985 A1    Dec. 19, 2013

(30) Foreign Application Priority Data

Jan. 10, 2012  (GB) .................................. 1200439.6

(51) Int. Cl.
| | | |
|---|---|---|
| *B62J 6/00* | (2006.01) | |
| *B62J 6/16* | (2006.01) | |
| *B62J 6/02* | (2006.01) | |
| *H05B 33/08* | (2006.01) | |

(52) U.S. Cl.
CPC .. *B62J 6/16* (2013.01); *B62J 6/02* (2013.01); *H05B 33/0845* (2013.01)

(58) Field of Classification Search
CPC .................................................. H05B 33/0845
USPC .......................................... 362/473; 315/362
See application file for complete search history.

(56) References Cited

U.S. PATENT DOCUMENTS

| | | | | | |
|---|---|---|---|---|---|
| 7,478,918 | B2 * | 1/2009 | Petzl et al. | ..................... | 362/205 |
| 7,988,344 | B2 * | 8/2011 | Ma et al. | ..................... | 362/474 |
| 8,038,311 | B2 * | 10/2011 | Lau | ............................... | 362/105 |
| 8,550,654 | B2 * | 10/2013 | Olsen | ........................... | 362/191 |
| 8,610,372 | B2 * | 12/2013 | Rothschild | .................... | 315/291 |
| 2002/0058459 | A1 * | 5/2002 | Holt | .............................. | 446/484 |
| 2004/0105273 | A1 * | 6/2004 | Takeda | ......................... | 362/473 |
| 2006/0077678 | A1 * | 4/2006 | Chen | ............................. | 362/475 |
| 2009/0261737 | A1 * | 10/2009 | Wright | .................. | F21L 4/027 |
| | | | | | 315/154 |
| 2010/0219775 | A1 * | 9/2010 | Maglica et al. | .............. | 315/362 |
| 2012/0098465 | A1 * | 4/2012 | Rothschild | .................... | 315/360 |
| 2012/0140451 | A1 * | 6/2012 | Araujo et al. | ................ | 362/103 |

(Continued)

OTHER PUBLICATIONS

Beliveau, A (Evaluation of MEMS capacitive accelerometers; IEEE 10.1109/54.808209). Oct.-Dec. 199, ISSN 0740-7475.*

(Continued)

*Primary Examiner* — Anh Mai
*Assistant Examiner* — Matthew Peerce
(74) *Attorney, Agent, or Firm* — Jennifer Meredith, Esq.; Meredith & Keyhani, PLLC

(57) ABSTRACT

A lamp with a housing; a battery mounted within the housing; an illumination LED or array thereof mounted on the housing; a status display LED array mounted on the housing; an inertial sensor for sensing change of position and/or orientation of the housing; circuitry adapted to control the lamp between a quiescent state when no LED is ON, an active state when the status display LED array is ON and an illumination state when at least one illumination LED is ON and to: switch from the quiescent state to the active state on detection via the inertial sensor of a position/orientation user action of a first type alone, switching ON one or more status LED and to switch from the active state to the illumination state on detection via the inertial sensor of a position/orientation user action of a second type alone, switching ON one or more illumination LED.

13 Claims, 4 Drawing Sheets

(56) References Cited

U.S. PATENT DOCUMENTS

2012/0167685 A1* 7/2012 Guo et al. .................. 73/514.32
2012/0182748 A1* 7/2012 McCaslin et al. ............ 362/473
2012/0281399 A1* 11/2012 Crookham et al. ........... 362/231

OTHER PUBLICATIONS

Beliveau, A (Evaluation of MEMS capacitive accelerometers, IEEE 10.1109/54.808209). Oct.-Dec. 199, ISSN 0740-7475.*

* cited by examiner

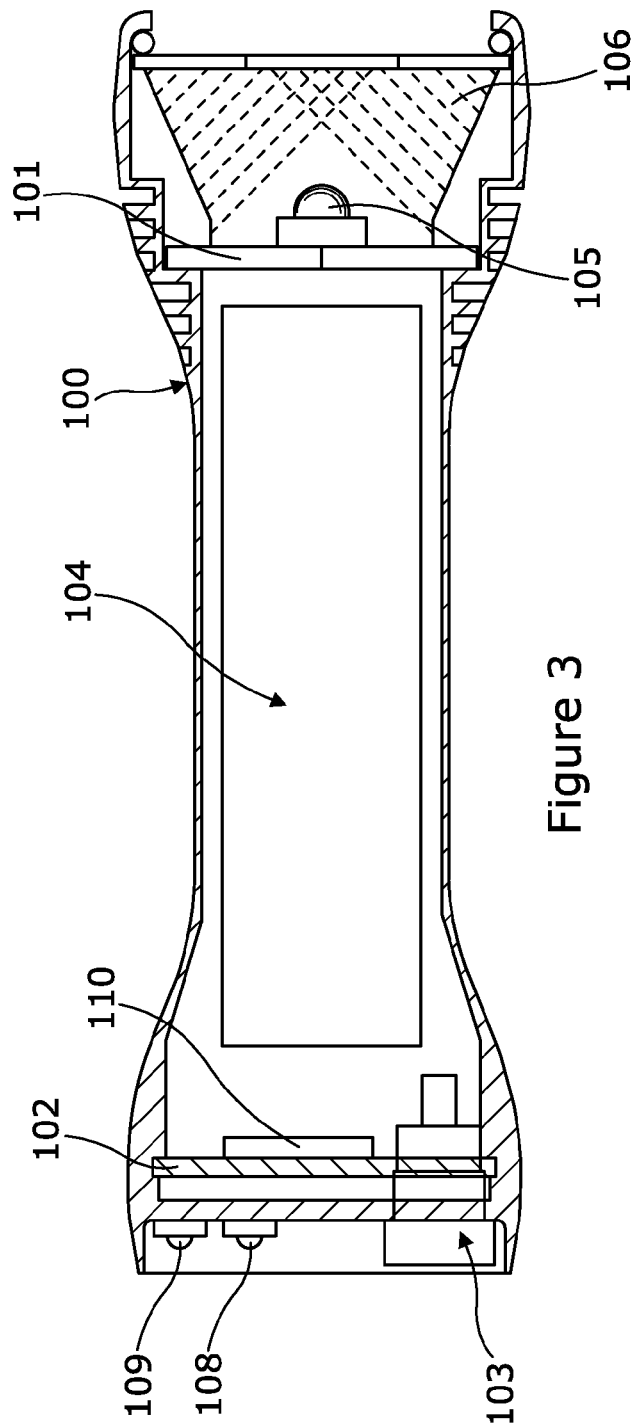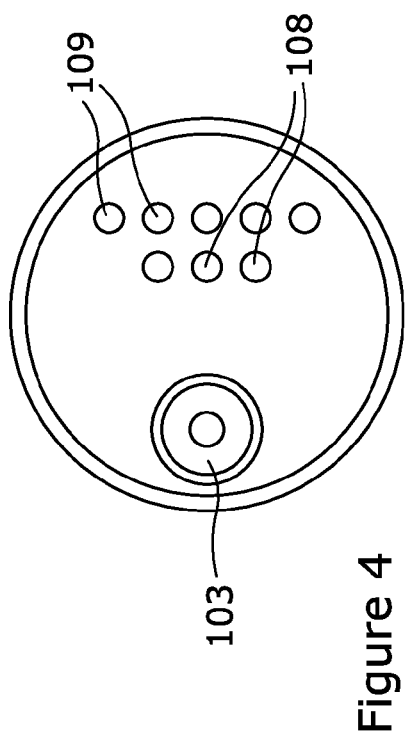
Figure 3
Figure 4

DIVE LIGHT

This application claims priority to British Application Number 1200439.6 filed on 10 Jan. 2012 in the United Kingdom, which is incorporated herein by reference.

The present invention relates to a lamp and in particular a battery-powered, LED (light emitting diode) lamp.

A toy wand is known from US Patent Application U.S. 2002/0058459. In the words of the abstract: "The wand is activated and controlled by a sequence of motions of the wand while in the hand of an operator. When moved through a specific sequence of motions (herein termed a "spell"), the wand will produce an appealing display of lights whose purpose is to amuse or entertain the wand operator or others in the viewing area. The toy wand comprises a casing, a means for detecting a sequence of motions, one or more lights, and a means for providing time-varying illumination from the lights as a function of the history of motions of the wand."

The means for detecting a sequence of motions is an accelerometer and the lights are LEDs alternatively illuminated in accordance with the movement detected by the accelerometer.

A portable lighting device is known from US Patent Application U.S. 2010/0219775. In the words of the abstract:

"A portable lighting device having a plurality of modes of operation and method of operating the portable lighting device are disclosed. One method of operating the portable lighting device is by rotating the portable lighting device along a principal axis of projection of the light source to enter into a new mode of operation. Normal, dim, motion sensitive, variable brightness, blink, right and left hand, lock out, SOS, night light, strobe, compass and signal modes are disclosed, and the modes may be adjusted. A rechargeable battery pack is disclosed that includes a housing, a rechargeable battery, and an accelerometer. A battery cassette is disclosed that provides a negative electrode at each end of the battery cassette, and a central connector that provides a positive electrode at both ends of the battery cassette."

The lamp as marketed has a button that must be depressed in with indicia for the required mode upper most. The mode is then initiated. After initiation, selections within the mode, for instance flash on and off can be selected by turning about the barrel with out the button depressed.

In our UK patent application No 2,462,935 9 (Our Earlier Application), an LED lamp is described whose output can be stepped between different levels of output. Most of our lamps are sold for use on pedal bicycles including mountain bikes. Riders of the latter are very conscious of the length of power left in the batteries of their lamps, to such extent that when conditions are good and/or when they are going slowly, they turn their lamps down despite this requiring awkward pressing on the button on the end of the lamp mounted on the handlebars.

The object of the present invention is to provide an improved LED lamp adapted to be controlled entirely by movements imparted to it.

For completeness it should be noted that the invention of Our Earlier Application related to the ability to draw power from a lamp's battery for external use. As such it's invention was claimed as:

A lamp adapted to power itself and an external device from its own internal battery, the lamp comprising:
 a housing;
 a light emitting device mounted on the housing;
 a battery mounted within the housing;
 a port for charging the battery mounted on the housing;
 a switch for switching on/off the light emitting device;
 means for supplying electric current from the battery for external use.

According to the present invention there is provided a bicycle lamp comprising:
 a housing;
 a battery mounted within the housing;
 an illumination LED or array thereof mounted on the housing;
 a status display LED array mounted on the housing;
 a inertial sensor for sensing change of position and/or orientation of the housing;
 circuitry adapted to:
  control the lamp between:
   a quiescent state when no LED is ON,
   an active state when the status display LED array is ON and
   an illumination state when at least one illumination LED is ON and to:
  switch from the quiescent state to the active state on detection via the inertial sensor of a position/orientation user action of a first type, switching ON one or more status LED and to
  switch from the active state to the illumination state on detection via the inertial sensor of a position/orientation user action of a second type, switching ON one or more illumination LED.

Preferably, the circuitry is further adapted to switch between successive brightnesses of illumination by repetition of the second type of user action, with increase of brightness following this action in one sense and decrease in brightness following this action in the opposite sense. Normally this action will be movement in an arc, clockwise being the one sense and anti-clockwise being the other sense. Alternatives are inversion one way or the other and swinging one way or the other.

It is also preferred for a further action in the decrease sense when the lamp is in low or lowest brightness to switch the lamp OFF, bypassing the active state. Preferably this action needs to be taken with the lamp in a predetermined orientation to avoid switching from high illumination to OFF without stopping at intentional low illumination Where it is preferred that there are modes of illumination beyond mere changes in brightness, they can be selected by further action of a third type. However, in the preferred embodiment, they are selected by further actions of the one type and indeed the same number of such actions, although differing numbers may be used. These modes can be selected sequentially, but again in the preferred embodiments they are selected by their application, with the lamp in differing orientations.

Preferably the one type of user action (for switching from quiescent state) involves faster changes of position and/or orientation or differentials thereof i.e. accelerations, than those of the other type. In the preferred embodiment, the one type of action involves a plurality of sharp taps against the lamp, involving relatively high accelerations, with little overall change of position, and correspondingly high signals from the sensor such as to be able to be detected by the circuitry which is quiescent; whereas the second type of action involves gentler circular movements involving lower accelerations and lower signals able to be detected by the circuitry in active state.

Preferably the circuitry is adapted maintain the status display LED array ON in the illumination state.

In the preferred embodiment, the status display LED array includes a first array of LEDs to indicate battery status and a second array of LEDs to indicate illumination brightness.

The inertial sensor will normally be a capacitive Micro-Electro-Mechanical Systems (MEMS) accelerometer, adapted to detect movement of the sensor by virtue of the displacement of a seismic mass between two charged plates causing a change in the capacitance between the two plates. Thus the accelerometer can detect movement of the lamp and the housing in terms of acceleration of the mass and orientation in terms of the gravitational attraction on the mass.

To help understanding of the invention, a specific embodiment thereof will now be described by way of example and with reference to the accompanying drawings, in which:

FIG. 3 is a diagrammatic cross-sectional view of a lamp in accordance with the invention;

FIG. 4 is an end view of the lamp of FIG. 3, showing battery-status and illumination power LEDs;

Figure 1:
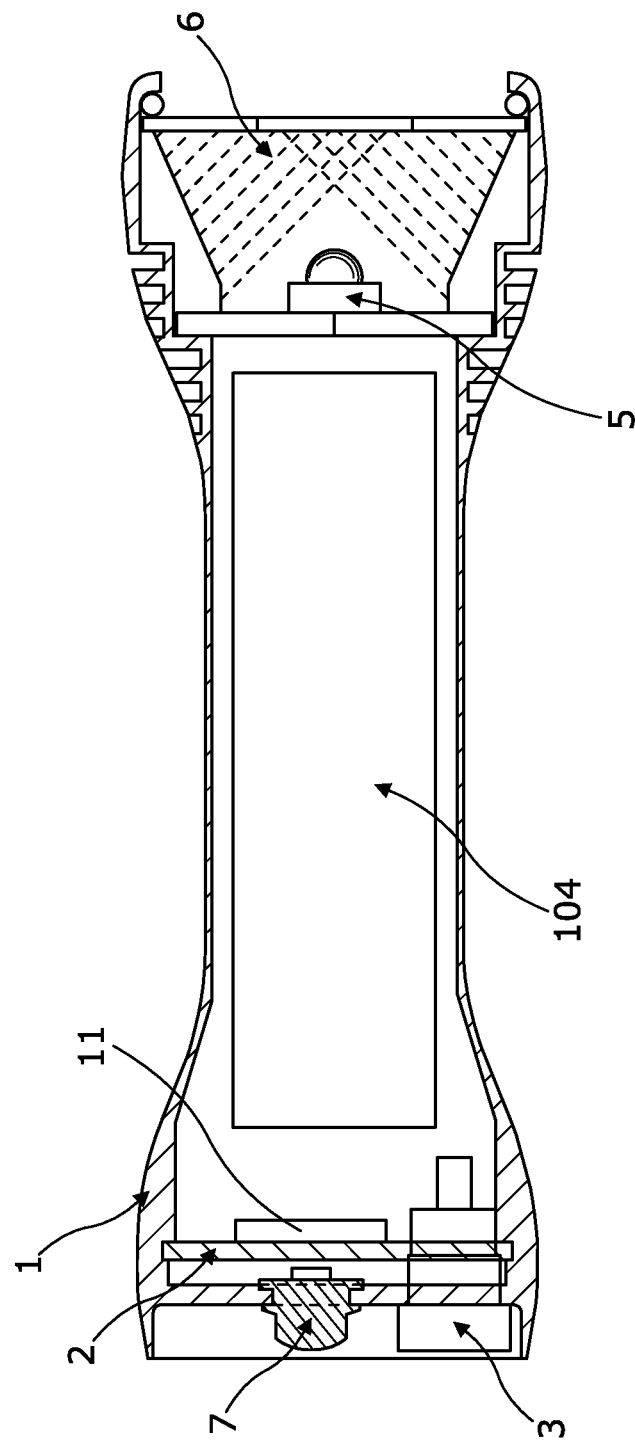
FIG. 1 is a diagrammatic cross-sectional view of a lamp of Our Earlier Application.
Figure 2:
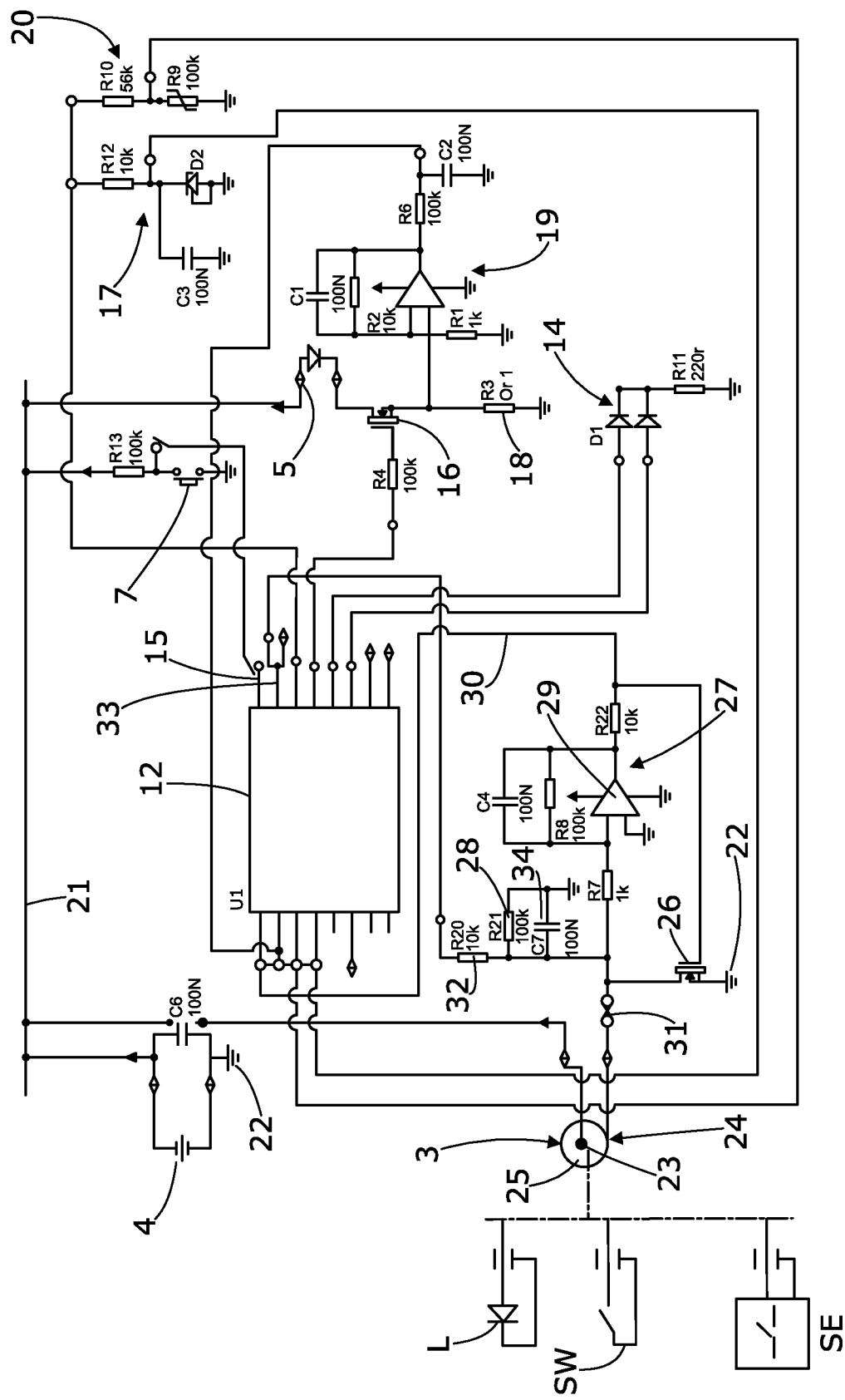
FIG. 2 is a circuit diagram of the lamp of FIG. 1.

Referring to the drawings, of which FIGS. 1 and 2 are re-numbered ones from Our Earlier Application. Most of the physical features of the lamp of the preferred embodiment of that application are used in the preferred embodiment of the lamp of the present invention. For completeness, the description with reference to the drawings of Our Earlier Application is repeated below in italics—omitting certain detail irrelevant for present purposes.

*A lamp has a body 1, in which is mounted a printed circuit board (PCB) 2, to which is connected amongst other components a charging port 3. A battery 4 is housed in the body, which also carries a light emitting diode 5 and a reflector 6 at the end opposite from the port 3. Adjacent the port is a press button switch 7. FIG. 1 is diagrammatic, insofar for instance as wiring is not shown.*

*A power management circuit 11, mounted in physical form on the PCB 2, has a programmed microprocessor/integrated circuit (IC) 12 of the PIC18F1320-1/SS type. It is programmed in accordance with the description below, but could be programmed with differences in detail.*

*The port 3, the battery 4, the LED 5 and the switch 7 are connected to the circuit. The switch incorporates a bi-colour LED 14 powered by the IC 12 to indicate battery state and the state of powering of the lamp. The switch itself is connected to ground an input terminal 15 of the IC for controlling it.*

*The LED is switched on by applying a voltage to the base of a switching field effect transistor 16 in series with its earth connection. Brightness of the LED is controlled by pulse width modulation, that is controlling proportion of the time that it is switched on, that is the proportion of the time that current is actually flowing through it. To maintain the brightness constant, the IC is provided with a battery voltage measuring circuit 17 and is programmed to adjust the pulse width of current supply for desired brightness. The actual current is measured in terms of voltage across a resistor 18 in series with the transistor 16, the voltage being measured by an amplifier circuit 19 and fed back to the IC 12 for control of the pulse width. A temperature measuring circuit 20 is provided to reduce the current in the event of LED resistance drop to avoid thermal run away. The IC 12 can be programmed to reduce the brightness in event that the temperature rises unacceptably.*

*The battery is connected between a positive voltage line 21 and local earth 22 in the lamp. The central contact 23 of the port 24 is connected to the voltage line 21, i.e. to the positive battery terminal, but the outer contact 25 is not connected directly to earth. This is to protect the battery from accidental short-circuiting. In order to allow the battery to be charged, a field effect transistor switch 26 is provided, associated with a detection circuit 27. Normally the outer contact will be grounded via a high resistance (100 k) 28. When a charger voltage C, as opposed to a short circuit, is applied to the port 3, the input to the operational amplifier 29 in the detection circuit will have the polarity of its inputs reversed. It will change state, causing a positive voltage on its output and activate the switch 26 to provide a return path for the charging current via the local earth. The positive voltage is passed to the IC on line 30, causing the switch LED 14 to flash green, indicating charging. The lamp can still be used in this state, as when it is being used in conjunction with a back-up battery pack (not shown).*

*If an auxiliary load L is applied to the port, a route to ground is provided via the resistance 28. Thus a low voltage is applied across the load, assuming the load to be of lower resistance than the resistance 28.*

*The IC 12 can be controlled by operation of the switch to apply a voltage on line 30 switch on the transistor 26. Thus the load can be powered at full battery voltage. A fuse 31 is provided to protect against excessive current drain. Where as preferred the battery is a Lithium Ion battery it will be provided with its own internal battery protection circuit.*

By way of example, the lamp can have the following switch actuation protocol:
1. Double click to switch ON at full brightness—switch LED green;
2. Single subsequent click to medium brightness—switch LED orange;
3. Single subsequent click to low brightness—switch LED red;
4. Single subsequent click to full brightness—switch LED green;
5. Long subsequent click to flash—switch LED green;
6. Held subsequent click to switch off.

Figure 5:
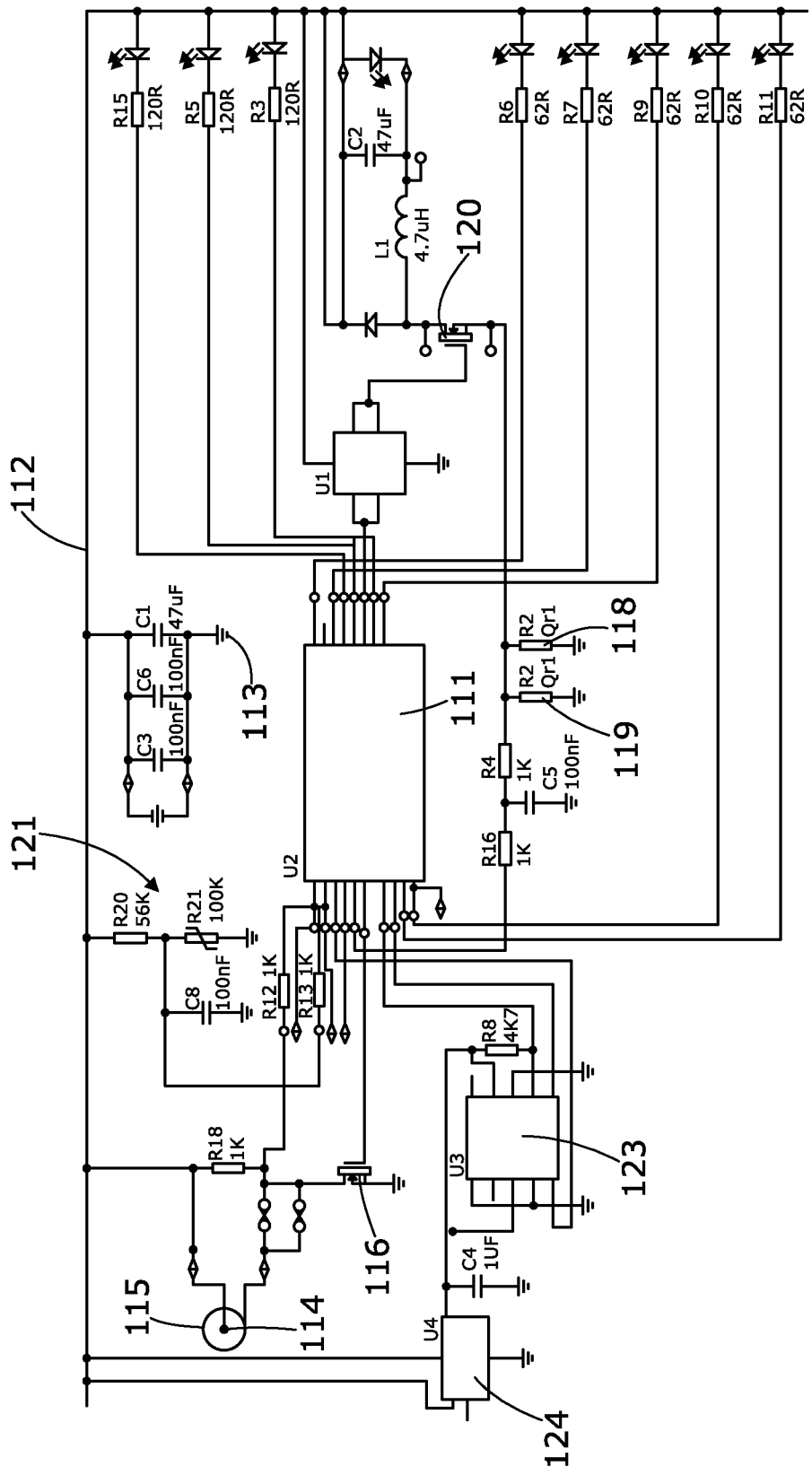
FIG. 5 is a circuit diagram of the lamp of FIG. 3.

Referring to FIGS. 3, 4 and 5, a lamp 100 of the present invention is similar to that of Our Earlier Application in having a printed circuit board (PCB) 102 and a battery 104 mounted in the body. An LED 105, mounted on an emitter plate 101, and a reflector 106 are housed on the body at an opposite end to a charging port 103. Adjacent to the port 103, an array of three illumination status blue LEDS 108 and an array of five battery-status red LEDs 109 are provided. In this embodiment, prior press button switch 7 is omitted.

The components 103-109 are connected to a power management circuit 110 which is mounted on the PCB 102. The power management circuit is similar to the prior circuit 11 although it has a different integrated circuit (IC) 111 to that of IC 12, of the PIC18F14K22-I/ML type.

The positive terminal of the battery 104 is connected to positive voltage line 112 and the negative terminal to local earth 113. Again the central contact 114 of port 103 is connected to the positive voltage line 112 and the outer contact 115 is not connected directly to earth. A field effect transistor switch 116 is provided to allow the battery to be charged, however the prior detection circuit 27 is omitted since the charging port is not required for the supply of electrical current from the battery for external use.

The actual current is again measured in terms of voltage across resistors 118 and 119 via transistor 120, however the prior amplifier circuit 19 is omitted and the signal is fed back to the IC 111 where the voltage is measured by a voltage measuring circuit within the IC 111 for control of pulse width.

A circuit board temperature measuring circuit 121, similar to prior circuit 17, is also provided.

The PCB 102 includes a capacitive Micro-Electro-Mechanical Systems (MEMS) accelerometer 123 of the type having a seismic mass, such that it can detect acceleration of the printed circuit on which it is mounted, i.e. acceleration of the lamp as well as the orientation of the lamp by virtue of the action of the gravity on the seismic mass. A voltage regulator 124 between the accelerometer 123 and the positive voltage line 112 limits the maximum voltage which can be applied to the accelerometer. Measurement signals from the accelerometer are also fed into the IC 111 which is programmed to respond to specific signal patterns generated by specific user actions on the lamp as described below.

In the quiescent state of the circuit, corresponding to that of the lamp of Our Earlier Application which is switched from quiescent to illumination state by pressing the button switch 7, the lamp is subjected to a first type of user action, in that it is tapped laterally of its body five times. Tapping without significant overall movement generates sufficiently high signals from the accelerometer for them to be recognised even although the circuit is in quiescent state. This switches the circuitry on to the extent that the battery status LEDs 109 are switched ON to indicate the state of charge of the battery. Five taps are used to ensure that the lamp does not switch to this active status unintentionally, in that it is intrinsically unlikely that five successive taps would be imparted to the lamp except with the deliberate intention of switching it on.

In the active state of the circuit, with the lamp grasped and circled around an approximately circular path of the order of 150 to 300 mm diameter in about a second, i.e. a second type of user action, the accelerometer is subject to much lower accelerations although they are relatively even and extend over a longer period than those associated with the taps. One such circulation causes the circuit to switch chopped DC voltage to the LED(s) for sufficient current that a low level of illumination is switched ON. A further circulation switches to medium illumination and a third to high illumination. The circuit is set up such that it is clockwise circulation with the illumination LEDs down (for the purposes of determining the sense of circling not orientation of the lamp per se) that switches the illumination on and increases it, whereas anticlockwise illumination switches it off with a further circulation from low power switching the lamp back to the quiescent state from the illumination state, by-passing the active state and extinguishing the array of status LEDs as well as the illumination LEDs. However this switch OFF is caused only if the lamp is pointing downwards, to avoid unintentional switching off. The accelerometer is adapted to detect orientation of the lamp such as pointing downwards, since it can detect the direction of gravity acting on it.

It can be mentioned here that this lamp is particularly suited to diving use, where one handed operation is preferred. For this the lamp is of course made waterproof. In order to provide good underwater illumination, it is generally provided with three or four reasonably powerful LEDs, as presently commercially available.

The IC 111 is programmed to reduce the brightness of the lamp on detection of an increase in the average temperature signal from the temperature sensor circuit 121 measured over a period of one or two minutes. Similarly the IC 111 is programmed to increase the brightness on detection of a decrease in the average temperature. Such alteration can allow the the lamp to be used both in and out of water, Other modes are useful for diving. The lamp is switched to a strobe mode, i.e. regular flashing, for signalling to another diver, by five taps of the lamps, as in switching from quiescent state, with the lamp pointing up. This mode can be switched to from any state of illumination. SOS mode ( . . . - - - . . . - - - . . . ) is switched to in like manner with the lamp pointing down. Both strobe and SOS mode can be switched from to high illumination by cycling clockwise as in the second type of user action.

The above operations can be summarised as follows:
1. Five taps in any orientation to activate the lamp and to observe the battery charge level;
2. Having activated the lamp with 5 taps circle the light clockwise to turn on;
3. Circle clockwise to increase output;
4. Circle anti-clockwise to decrease output;
5. Five taps when on and vertically pointing down to activate S.O.S;
6. Five taps when on and vertically pointing upwards to activate flash;
7. Rotate clockwise to go to high mode from S.O.S or Flash;
8. Circle anti-clockwise whilst pointing vertically down to switch off.

The actual firmware to execute the above is believed to be within the capabilities of the skilled reader and will not be described as such.

The invention is not intended to be restricted to the details of the above described embodiment. For instance different user operations may be used to operate the lamp and to change the modes of operation. In addition various alternative modes of operation of the lamp may be programmed.

The invention claimed is:
1. A lamp comprising:
a housing;
a battery mounted within the housing;
an illumination LED or array thereof mounted on the housing;
a status display LED array mounted on the housing;
an inertial sensor for sensing change of position and/or orientation of the housing;
circuitry that controls the lamp between
a quiescent state when no LED is ON,
an active state when the status display LED array is ON and
an illumination state when at least one illumination LED is ON:
wherein the circuitry switches from the quiescent state to the active state to turn the status display LED array ON upon detection of only the inertial sensor detecting a position/orientation user action of a first type; and
wherein the circuitry switches from the active state to the illumination state on detection of only the inertial sensor detecting a position/orientation user action of a second type, switching ON one or more illumination LED, wherein the status display LED array includes a first array of LEDs to indicate battery status and a second array of LEDs to indicate illumination brightness.

2. The lamp as claimed in claim 1, wherein the circuitry further switches between successive brightnesses of illumination by repetition of the user action of a second type, with increase of brightness following this action in one sense and decrease in brightness following this action in the opposite sense.

3. The lamp as claimed in claim 2, wherein the user action of a second type switches between successive brightnesses of illumination and is movement in an arc, clockwise being the one sense and anti-clockwise being the other sense, or the action is inversion of the lamp one way or the other, or swinging of the lamp one way or the other.

4. The lamp as claimed in claim 2, wherein the circuitry is adapted for a further user action in the decrease sense when the lamp is in low or lowest brightness to switch the lamp OFF, bypassing the active state.

5. The lamp as claimed in claim 4, wherein the circuitry is adapted the further action in the decrease sense needs to be taken with the lamp in a predetermined orientation to avoid switching from high illumination to OFF without stopping at intentional low illumination.

6. The lamp as claimed in claim 1, wherein the lamp is further circuit controlled to switch between modes of illumination other than changes in brightness by a further user action of a third type.

7. The lamp as claimed in claim 6, wherein the third type of user action is the same as the first type of user action and/or comprises a different number of actions to the first type of actions.

8. The lamp as claimed in claim 6, wherein the modes of illumination are selected sequentially on each repetition of the third type of action or are selected by their application, with the lamp in differing orientations.

9. The lamp as claimed 1, wherein the first type of user action for switching from the quiescent state to the active state involves faster changes of position and/or orientation or differentials thereof, i.e. accelerations, than those actions of the other type or types.

10. The lamp as claimed in claim 9, wherein the first type of action for switching from the quiescent state involves a plurality of sharp taps against the lamp, has a higher acceleration with respect to the other action or actions, with little overall change of position, and correspondingly high signals from the sensor to be able to be detected by the circuitry which is quiescent.

11. The lamp as claimed in claim 9, wherein the second type of user action involves lower accelerations and lower signals relative to the first type of action able to be detected by the circuitry in the active state.

12. The lamp as claimed in claim 1, wherein the circuitry maintains the status display LED array ON in the illumination state.

13. The lamp as claimed in claim 1, wherein the inertial sensor is a capacitive Micro-Electro-Mechanical Systems (MEMS) accelerometer.

\* \* \* \* \*